Nov. 4, 1930.          H. V. TÖRNEBOHM          1,780,211
RADIUS TEMPLATE GRINDING MACHINE
Filed Dec. 8, 1928          2 Sheets-Sheet 1
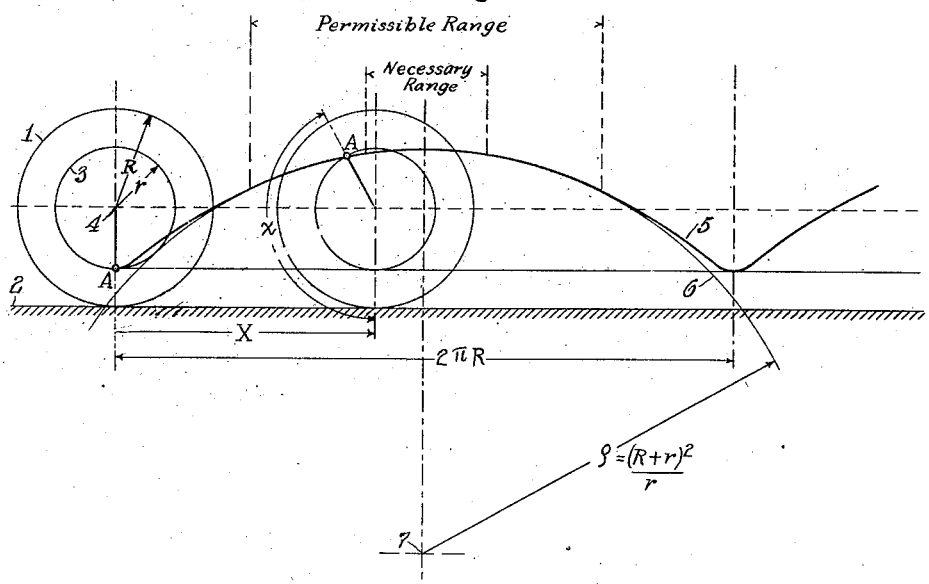
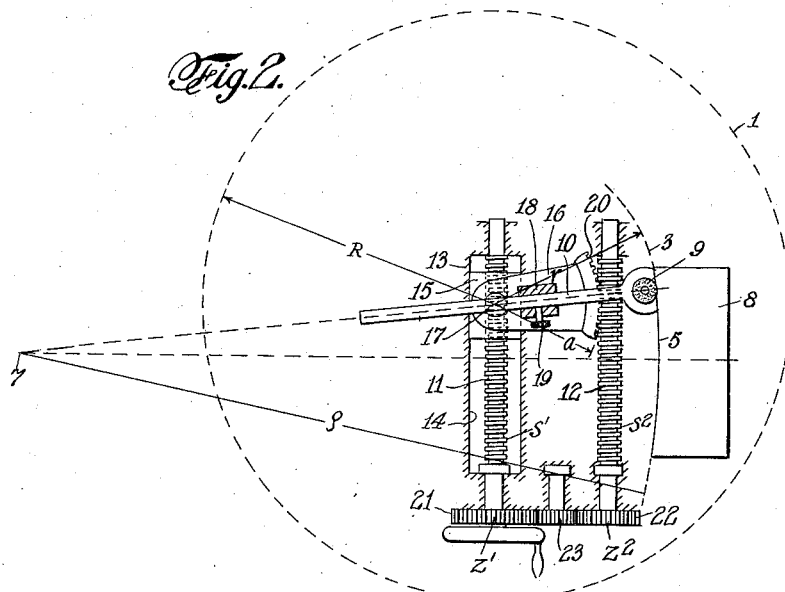
INVENTOR
Hilding V. Törnebohm
BY
ATTORNEY Nov. 4, 1930.  H. V. TÖRNEBOHM  1,780,211
RADIUS TEMPLATE GRINDING MACHINE
Filed Dec. 8, 1928   2 Sheets-Sheet 2
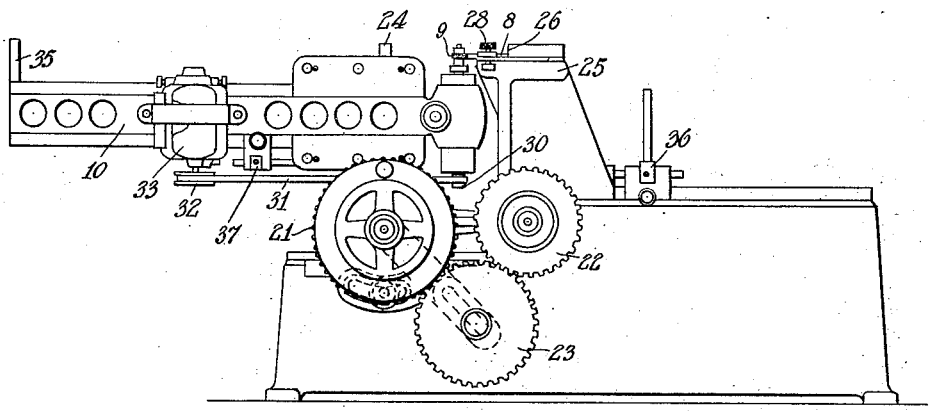
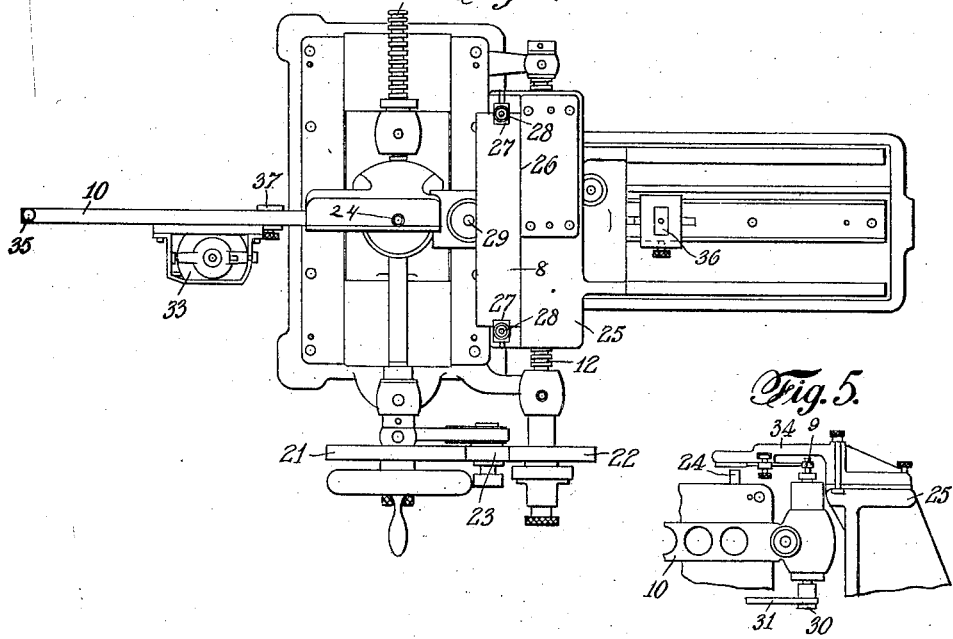
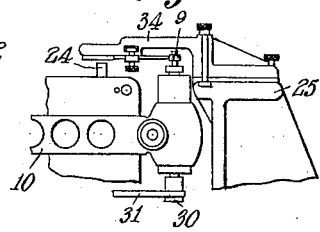
INVENTOR
*Hilding V. Törnebohm*
BY
ATTORNEY Patented Nov. 4, 1930

1,780,211

UNITED STATES PATENT OFFICE

HILDING VALDEMAR TÖRNEBOHM, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN

RADIUS-TEMPLATE-GRINDING MACHINE

Application filed December 8, 1928. Serial No. 324,757.

The object of this invention is to provide a machine for grinding templates of larger radius than can conveniently be produced on a machine in which the grinding wheel turns on a mechanical pivot and the template is stationary or vice versa.

When it is necessary in the mechanical operations connected with quantity production to cause a grinding wheel to move in the arc of a circle having a comparatively large radius, it has been found expedient to produce this result by means of a template rather than by mounting the grinding wheel upon a carriage turning about a fixed mechanical pivot. It has been found difficult to generate such a template by a wheel mounted upon a carriage movable about a mechanical pivot because of the vibration of the long carriage and associated parts.

According to the present invention, the grinding wheel is caused to pass through an arc approximating the arc of a circle by mechanism which moves a segment of the radius vector of the curve in a manner such that the extremity or generating point describes a prolate cycloid.

The rate of change of the radius of curvature within a certain range on either side of the middle point of the arc of a prolate cycloid is so small in magnitude as to justify the practical approximation of considering it to be zero. The cycloidal curve will then approximate a circular arc in this range, within the limits of the above approximation. The deviation of the cycloidal curve from the true circle is greater at points remote from the middle point of the arc and the range thus depends on the accuracy required. In practice it will seldom be necessary to make use of more than a relatively small part of this range at the flat portion of the arc.

It may be demonstrated mathematically that this portion of a prolate cycloid so nearly approximates the curvature of a circle that it is impossible with the degree of precision available in practical measuring instruments, in a curve having a radius of from 1 to 10 meters, to detect the variation of the cycloidal arc from the arc of a circle if a suitable combination of the radii determining the cycloid is used.

The invention can best be described in connection with a diagram and views illustrating a machine which has been used in carrying out the invention.

In the drawings Fig. 1 is a diagram or chart.

Fig. 2 is an enlarged detail of certain portions of the machine surrounded by a chart, the setting shown being for generating a concave template.

Fig. 3 is an elevation of the complete machine.

Fig. 4 is a top view of the machine shown in Fig. 3, and

Fig. 5 is a detail of the part arranged for generating a convex template.

Reference will first be made to Fig. 1 in which 1 will be assumed to be the generating circle having the radius R rolling upon the base line 2. A is the point set within the circumference of the circle 1 which is to inscribe the curve, and which, for convenience, will represent the grinding wheel of the machine presently to be described. The radius of the circle 3 through which this point would pass if the circle 1 were rotated upon a fixed axis, is represented at $r$. The centre of the circles 1 and 3 is indicated at 4.

The circle 1, in making a complete rotation from the left-hand position, causes the point A to inscribe the prolate curve 5 which, throughout a considerable arc of its shallow portion, very closely approximates the circle represented at 6. At the part indicated "permissible range" the cycloid curve and the circle curve are practically congruent. For most practical purposes the template being formed will be much shorter than this permissible range, and will be assumed to come within the limits of "necessary range" indicated on the drawing. It is thus possible to get the desired solution of the problem with a high degree of accuracy.

The centre of the circle 6 is represented at 7 having a radius $\rho$. According to known formula $\rho$ is calculated from the formula $$\rho = \frac{(R+r)^2}{r}.$$

The cycloid curve is generated by a combination of rotary and parallel movements.

In designing this machine, after the primary theoretical calculations have proved that this principle could be used with advantage under certain conditions, it may be mentioned that the radius $r:R$ should preferably not be smaller than 0.3 and not be larger than 0.75 in order to obtain sufficient accuracy on the longest templates.

In Fig. 2 the template which is to be produced is indicated by 8, and the grinding wheel which corresponds to the point A of the diagram in Fig. 1 is indicated by the reference character 9. The curve which is to be produced on the template is represented by the reference character 5 corresponding with the cycloidal curve in Fig. 1 which, as before explained, is at the flat portion of the arc practically congruent with the arc of a true circle. No difficulty would be experienced in grinding a template, such as that above considered, if it were possible to mount a grinding wheel as 9 upon a carrier such as 10, and move that carrier through a path which would cause the working point of the grinding wheel to traverse the curve of a true circle and to cause the centre line of the carriage 10 to, at all times, occupy a position which would be a segment of the radius of the curve being generated by such grinding wheel. This involves considerable difficulty without accomplishing any practicable advantage over producing the curve as a prolate cycloid.

Two parallel screws lying approximately in the plane of movements of the template and generating parts are shown. These screws are indicated by the reference characters 11 and 12 and have preferably somewhat different pitches, indicated by $S_1$ and $S_2$ respectively. These screws are represented as mounted in the frame-work 13 of the machine which will later be described in more detail. The frame 13 is provided with a guideway 14 in which is mounted a slide 15 in the form of a nut running upon the screw 11. An oscillatory member 16 is pivoted to the nut 15 at 17 and has an upstanding socket 18 in which the carrier 10 for the grinding wheel 9 is longitudinally adjustable, it being held in its position of adjustment by means of a set screw 19.

Upon the edge of the oscillatory member 16 is a toothed sector 20 which is in mesh with the screw 12. These screws are adapted to be rotated in the same direction by means of gear wheels 21 and 22 which are connected by means of an idler 23. The gear wheel 21 has a number of teeth represented by $Z_1$ and the gear wheel 22 a number of teeth represented by $Z_2$.

The constants of the machine are the radius $a$ of the sector 16 and the above mentioned pitches $S_1$ and $S_2$. Interchangeable gear wheels with the above mentioned number of teeth $Z_1$ and $Z_2$ are provided. With different gears different generating circles 1 can be obtained. Experience has shown that a single machine may conveniently be equipped with six sets of gear wheels for producing templates having a range of radius from 1 to 10 meters.

From the foregoing it will be obvious that by the simple mechanism described a grinding wheel can be caused to follow the path of a point on the circumference of a rolling circle, which describes the shallow portion of a prolate cycloid and which is practically congruent with the arc of a circle.

Figs. 3 and 4 show, on a smaller scale, the machine carrying the mechanical parts illustrated in Fig. 2. The point 24 represents the centre of the generating circle represented at 1 in Figs. 1 and 2. The template 8 is mounted on the top surface of an upstanding portion 25, and its back is positioned by a suitable face 26. The ends of the template are shown held in position by clamps 27 and set screws 28. The shaft 29 of the grinding wheel carries a pulley 30 driven by means of a belt 31 from the pulley 32 of a suitable electric motor 33 which is mounted on the radius bar 10. The post 35 at the end of this radius bar is employed in adjusting the machine so that the centre of the generated curve is located on any required perpendicular to the back of the template which is represented by the positioning surfaces 26. The template is fixed in such a position that the required perpendicular passes through the centres of the points 3 and 4, the line through these being perpendicular to the straight back of the template.

A screw adjusting device 36 is provided for adjusting the position of the template holder 25, and a screw device 37 is provided for adjusting the position of the grinding wheel relative to the centre of the generating circle, i. e. for adjusting the dimension $r$. Both screws are used for obtaining a final accurate adjustment after first adjusting roughly by hand.

In Fig. 5 the template holder 25 is shown provided with an attachment 34 which shows the positions taken when grinding convex surfaces on templates. When convex surfaces are ground a diametrically opposite point on the grinding wheel is used with that employed in grinding concave surfaces.

Although the two feed screws designated 11 and 12 should be taken as being of different pitch, $S_1$ and $S_2$, they can, if desired, be of the same pitch. Even if, with modern accurate machine tools, it is attempted to manufacture a pair of screws with exactly the same pitch, it is probable that there will be a slight difference in pitch between them which will be sufficient to be of importance in this special grinding machine.

As above stated, both the screws 11 and 12 are rotated at certain speeds by their gear wheels 21 and 22, having a suitable number of teeth $Z_1$ and $Z_2$. By means of the screw 11 the lower sliding part of the grinding wheel carriage, i. e. the nut 15, is given a movement corresponding to the movement of the generating circle 1 designated by the rectilinear dimension X in Fig. 1. The screw 12 gives the upper rotatable part 16 of the grinding wheel carriage a rotating movement corresponding to the arc X in the same Fig. 1. The feed of the screw 12 must be greater than that of the screw 11 in order to give the radius bar 10 its turning movement notwithstanding the rectilinear movement imparted by the screw 11.

The radius $a$, like the two screw pitches mentioned above, is a machine constant and is chosen by the designer. This constant is measured to obtain its exact value upon the completion of the machine.

By referring to Fig. 2 the following is the method of adjusting the machine for a certain desired grinding radius:

It is to be understood that the screws 11 and 12 are interconnected by means of gear wheels 21 and 22 having the gear ratio $Z_1$ and $Z_2$. The third or intermediate wheel is an idler, and the number of teeth with which it is provided is immaterial. Let the gear ratio $Z_2 : Z_1$ be $\epsilon$. This gear ratio may have an infinite number of values. In order to avoid providing the machine with more than a few gear wheels, the available gear ratios have been confined to six in the present type of machine. The gear ratio to be chosen by the operator for the desired radius $\rho$ within certain limits are given in a table accompanying the machine. From the table may also be found the value of the radius R of the equivalent generating circle. The radius R may be obtained from the formula $$R = \epsilon \frac{a.S_1}{S_2 - \epsilon S_1}$$

in which $a$, $S_1$ and $S_2$ are constants and $\epsilon$ the gear ratio $Z_2 : Z_1$.

After obtaining the value of R, either by calculation or from tables, it remains to calculate the value of $r$, i. e. the distance from the centre of the rolling circle to the grinding surface of the grinding wheel.

The formula used in calculating the dimension $r$ is $$r = 1/2[\rho - 2R - \sqrt{\rho(\rho - 4R)}]$$

In this formula $\rho$ is the radius of the required template and R the above mentioned radius of the equivalent generating circle.

It is to be understood that the form of machine shown in the drawings is illustrative, and that changes may be made within the scope of the claims without departing from the spirit of my invention. It is to be further understood that, although the invention is here described in connection with the grinding of curves of large radii on templates, it is also capable of being used for grinding other work.

Having described my invention, I claim and desire to secure by Letters Patent:

1. In mechanism for simulating the movement of the radius of a circle rolling along a straight line and for causing a point thereon to generate a cycloidal curve, comprising a carriage, means for causing the traverse of the carriage, an oscillatory member pivotally mounted on the carriage for movement in a plane including the line of carriage traverse, means for so oscillating such member including means for timing the oscillation in relation to the traverse of the carriage, and a working tool mounted on the oscillatory member and adjustable radially thereof, the organization being such that the working tool is caused to generate a selected portion of a cycloid.

2. In mechanism for simulating the movement of the radius of a circle rolling along a straight line and for causing a point thereon to generate a cycloidal curve, comprising a carriage, means for causing the traverse of the carriage, an oscillatory member pivoted on the carriage for movement in a plane including the line of carriage traverse, interchangeable gears for driving the carriage traversing mechanism and the member oscillating means in timed relation, a working tool mounted upon the oscillatory member and adjustable radially thereof, the organization being such that the working tool is caused to generate a selected portion of a cycloid.

3. In a grinding machine, the combination with means for simulating the movement of the radius of a circle rolling along a straight line for causing a point thereon to generate a cycloidal curve, comprising a carriage, a feed screw for causing the traverse of the carriage, an oscillatory member pivotally mounted on the carriage for movement on a plane including the line of carriage traverse, there being screw teeth formed on the oscillatory member, a feed screw meshing therewith, means for driving the feed screws in timed relation, a grinding wheel spindle mounted on the oscillatory member and adjustable radially thereof, the grinding wheel being thereby caused to generate a selected portion of a cycloid.

4. In a grinding machine, the combination with means for simulating the movement of the radius of a circle rolling along a straight line for causing a point thereon to generate a cycloidal curve, comprising a carriage, a feed screw for causing the traverse of the carriage, an oscillatory member pivotally mounted on the carriage for movement on a plane including the line of carriage traverse, there being screw teeth formed on the oscillatory member, a feed screw meshing therewith, interchangeable gears for driving the feed screws in timed relation, a grinding wheel spindle mounted on the oscillatory member and adjustable radially thereof, the grinding wheel being thereby caused to generate a selected portion of a cycloid.

5. In a machine tool, the combination with a carriage, of an oscillatory member mounted on the carriage for movement in a plane including the line of carriage traverse, a work performing tool mounted on the oscillatory member and adjustable radially thereof, and means for moving the carriage and the oscillatory member for imparting to the oscillatory member the movement of a segment of the radius vector of a prolate cycloid in the flat portion of the arc to thereby cause the work performing member to traverse a path approximating a circular arc.

Signed at Gottenborg, Sweden, this 7th day of November, 1928.

HILDING VALDEMAR TÖRNEBOHM.